3,297,668
PROCESS FOR THE PRECIPITATION OF HIGHLY POLYMERIZED HYDROCARBONS FROM EMULSIONS THEREOF CONTAINING CATION-ACTIVE EMULSIFYING AGENTS
Gerhard Berg and Günther Maass, Marl, Germany, assignors to Chemische Werke Huls Aktiengesellschaft, Marl, Germany, a corporation of Germany
No Drawing. Filed Jan. 28, 1963, Ser. No. 254,407
Claims priority, application Germany, Mar. 17, 1962, C 26,515
3 Claims. (Cl. 260—85.1)

It is known that highly polymerized hydrocarbons can be coagulated from aqueous emulsions thereof containing anion active emulsifiers by the addition of acids and/or solutions of salts such as sodium chloride, potassium chloride or aluminum sulfate. This process fails however in the case of aqueous emulsions of highly polymerized hydrocarbons which contain quaternary ammonium salts as cation-active emulsifiers. Moreover the addition of aqueous solutions of alkalies such as sodium hydroxide, potassium hydroxide, ammonia and/or aqueous salt solutions such as sodium acetate or sodium carbonate does not have any effect or effects only an incomplete coagulation of the polymer. Only a more or less slow creaming of the emulsion takes place.

It has now been found that highly polymerized hydrocarbons advantageously can be precipitated in fine flaky, readily filterable form from aqueous emulsions which contain quaternary ammonium salts as cation-active emulsifiers either alone or together with non-ionized emulsifiers and/or high molecular weight protective colloids by means of aqueous solutions of alkali metal silicates. The process is suitable for the precipitation of emulsions which contain quaternary ammonium salts such as tetradecyl-pyridinium bromide, alkyl-trimethyl-ammonium bromide, lauryl-dimethy-benzyl-ammonium bromide and lauryl-trimethyl-ammonium methylsulfate as emulsifiers. In addition to the quaternary ammonium salts the emulsions may contain non-ionized emulsifiers such as sperm oil alcohol-quadragintaglycol ether, lauryl-heptadecylglycol ether, p-octylphenol-trigintaglycol ether, stearic acid-decaglycol ester, oleic acid-diethanolamine, oleic acid diethanolamid, oleic acid monooxyethylamino-pentaglycol ether as well as protective colloids such as polyvinyl alcohol.

Highly polymerized hydrocarbons which are especially suitable for use in the invention are the polymers and mixed polymers of the mono- and diolefines such as, for example, butadiene, isoprene, ethylene, propylene, butylene and styrene.

Alkali metal silicate solutions and especially sodium silicate solutions in which the molecular ratio of $Na_2O$ to $SiO_2$ is within the range from 2:1 to 1:4 may be used. No limits are set for the concentration of the alkali metal silicate solution but the amount of $SiO_2$ supplied to the reaction mixture should be within the range from 25% to 500% of the equivalent amount of the cation active emulsifier present.

The precipitation of the highly polymerized hydrocarbon takes place suitably at a temperature within the range from 10 to 100° C. and preferably between 60 and 90° C. while the alkali metal silicate solution and the emulsion to be precipitated are mixed with stirring. Precipitation at room temperature may take several hours and give a finely divided polymer product. By working at a higher temperature the precipitation may be completed in less than 0.5 hour and the polymer precipitates in an easily filterable form.

The separation of the aqueous phase and washing of the polymer is carried out in the known manner, e.g., on a sieve, suction filter or centrifuge. When the wash water becomes practically neutral the polymer is slurried in acidified water at a pH within the range from 2 to 6 and preferably from 3 to 4, separated from the aqueous phase and again washed to the neutral point with water. The product after drying is colorless. However if the polymer is dried after the first washing, without the treatment with acidified water it may be faintly or even strongly colored.

Example 1

11 kg. of a 23% aqueous emulsion of polybutadiene which contains, based upon the polybutadiene, 5% of tetradecylpyridinium bromide, 2% of octylphenol trigintaglycol ether and 0.5% of polyvinyl alcohol is mixed in a 40 liter vessel with a solution of 10 liters of water and 390 g. of a 26% aqueous sodium water glass solution (=101 g. of $SiO_2$=4% $SiO_2$ based upon the polybutadiene) at room temperature. The mixture is then heated up to 80° C. in 20 minutes and stirred at this temperature for 10 minutes. The polymer is separated and washed until the wash water is neutral on a suction filter. The polybutadiene is then slurried in 100 liters of water, acidified to about pH 3 with sulfuric acid and then separated and washed as described above until sulfate ion is no longer detectable in the wash water. The resulting polybutadiene is then dried in a drying oven at about 75–80° C. giving a colorless caoutchouc product.

Example 2

10 kg. of a 20% aqueous caoutchouc emulsion obtained by emulsion polymerization of butadiene and styrene (70:30, conversion 60%), said emulsion containing 4.2% of alkyl-trimethyl-ammonium bromide based upon the weight of the polymer, is mixed at room temperature in a 40 liter vessel with a solution of 10 liters of water and 308 g. of a 26% aqueous sodium water glass solution (=80 g. $SiO_2$=4% $SiO_2$ based on the polymer). The mixture is heated up in 20 minutes to 80° C. and stirred for 10 minutes at this temperature. The separation and washing of the polymer to neutral reaction of the wash water is carried out in suction filter. The polymer is then slurried in 100 liters of water, acidified to about pH 3 with sulfuric acid, separated and washed (as described above until sulfate ion is not detectable in the wash water. The polymer is dried in a drying oven at about 75–80° C. and the resulting product is a colorless caoutchouc.

Example 3

5 kg. of a 15% aqueous polybutadiene emulsion which contains 2% of alkyl-trimethyl-ammonium bromide (alkyl=$C_{12}$–$C_{16}$), 4.5% of octylphenol-trigintaglycol ether and 0.5% of polyvinyl alcohol based upon the weight of the polybutadiene is mixed with stirring with a solution of 10 liters of water and 14.1 g. of 26% aqueous sodium water glass solution (=3.7 g. $SiO_2$) in a 40 liter vessel at 90° C. and stirred at this temperature for 20 minutes. The coagulated polymer is separated on a suction filter, washed with water until the wash water is neutral and dried at 75° C. The product is a nearly colorless caoutchouc.

We claim:
1. Process for the precipitation of a polymer selected from the group consisting of polybutadiene and butadiene-styrene copolymers from an aqueous emulsion thereof containing a quaternary ammonium salt selected from the group consisting of tetradecyl-pyridinium bromide, alkyl-trimethyl-ammonium bromide, lauryl-dimethyl-benzyl-ammonium bromide and lauryl-trimethyl-ammonium methylsulfate as cation active emulsifying agent which comprises precipitating the polymer from the emulsion by mixing it with an aqueous alkali metal silicate solution, the amount of $SiO_2$ supplied to the reaction mixture being within the range from 25% to 500% of the equivalent amount of the cation active emulsifier present.

2. Process as defined in claim 1 in which the emulsion contains also a non-ionic emulsifier.

3. Process as defined in claim 1 in which the emulsion contains a high molecular weight protective colloid.

References Cited by the Examiner

UNITED STATES PATENTS

| | | | |
|---|---|---|---|
| 2,393,261 | 1/1946 | Peaker | 260—29.6 |
| 2,401,027 | 5/1946 | Tausch. | |
| 2,663,650 | 12/1953 | Iler | 252—313 X |

OTHER REFERENCES

"Activated Silica in Paper Mill Water Systems," Industrial Water and Wastes, vol. 6, No. 6, November–December 1961, pp. 173–174.

JOSEPH L. SCHOFER, *Primary Examiner.*

MORRIS WOLK, *Examiner.*

M. E. ROGERS, J. A. SEIDLECK, *Assistant Examiners.*